United States Patent

Wilkerson, Jr.

Patent Number: 5,391,262
Date of Patent: Feb. 21, 1995

[54] SOLAR STILL VIBRATOR

[76] Inventor: William Wilkerson, Jr., 4214 University Dr., Charlotte, N.C. 28209

[21] Appl. No.: 513,385

[22] Filed: Apr. 23, 1990

[51] Int. Cl.$^6$ ............................................. B01D 3/00
[52] U.S. Cl. ................................. 203/10; 159/903; 202/155; 202/175; 202/234; 202/265; 203/DIG. 1
[58] Field of Search ............... 202/234, 265, 175, 155, 202/236, 242; 159/900, 903; 203/10, 1, DIG. 1, 89, 71; 366/144, 249

[56] References Cited

U.S. PATENT DOCUMENTS

| | | | |
|---|---|---|---|
| 983,424 | 2/1911 | Brosius | 159/903 |
| 2,265,762 | 12/1941 | McKittrick et al. | 159/900 |
| 3,271,272 | 9/1966 | Watt | 202/236 |
| 3,273,631 | 9/1966 | Neuman | 202/175 |
| 3,410,765 | 11/1968 | Bodine | 159/900 |
| 3,441,482 | 4/1969 | Avery | 202/175 |
| 3,775,257 | 11/1973 | Lovrich | 159/903 |
| 4,135,985 | 1/1979 | La Rocca | 159/903 |
| 4,249,317 | 2/1981 | Murdock | 159/903 |
| 4,696,719 | 9/1987 | Bischoff | 159/900 |
| 4,778,535 | 10/1988 | McCord | 202/175 |
| 4,935,209 | 6/1990 | Pfoutz | 159/900 |

FOREIGN PATENT DOCUMENTS

| | | | |
|---|---|---|---|
| 2452302 | 10/1980 | France. | |
| 1599809 | 10/1981 | United Kingdom | 202/234 |

Primary Examiner—Virginia Manoharan

[57] ABSTRACT

A solar still of the type having a container for holding a supply of liquid to be evaporated and an inclined solar transmissive cover mounted in an inclined position thereon, is provided with a vibrating device for imparting vibrations to the cover member to facilitate the coalescing and downward flow of condensation droplets formed on the underside of the cover member.

8 Claims, 4 Drawing Sheets

SOLAR STILL VIBRATOR

BACKGROUND OF THE INVENTION

The present invention is directed to a solar still vibrator and more specifically to an electrically operated device adapted to be attached to a solar still for imparting controlled vibrations to the still to facilitate run-off of the condensate droplets formed on the under surface of an inclined sheet.

A conventional solar still is comprised of a container for holding a supply of contaminated or brackish water and a transparent cover extending over the container which permits the rays of the sun to heat and evaporate the water. The cover is usually disposed at an angle relative to the surface of the water so that as the moisture condenses onto the inner surface of the cover, the water droplets will run down the inclined surface of the cover into a suitable collection trough, or the like. Initially, due to surface tension, the droplets forming on the inclined surface tend to remain in one place. Eventually, small adjacent droplets coalesce into a drop of water that runs down the underside of the surface to the collection trough. However, due to the presence of a large number of droplets on the underside of the inclined surface, the efficiency of the solar transmission through the cover is compromised.

In order to improve the efficiency of a solar still, it has been proposed in French Patent No. 2,452,302 to provide a moving element for cleaning the condensing surface of the cover continuously or intermittently and to push the condensate into the collection trough. According to this patent, the moving element could be a manually operated or power driven wiper similar to an automobile windshield wiper. Alternatively, it was proposed in the patent, to remove the droplets of condensate by blowing compressed air over the surface or washing the droplets away by means of a liquid such as pre-collected condensate. The principle drawback with such a system resides in the fact that as the droplets are pushed into adjacent droplets, larger droplets will form to the extent that gravity will overcome the force adhering the droplets to the collection surface and the droplets would fall back into the body of contaminated water, which is being evaporated.

SUMMARY OF THE INVENTION

The present invention provides a new and improved solar still and a method for operating the same which overcomes the drawbacks of the prior art discussed above.

The present invention provides a new and improved solar still and a method for operating the same wherein controlled vibrations are applied to the inclined condensate collection surface to gently cause the coalescence of small droplets into larger droplets which will then flow down the inclined surface into a collection trough, thereby substantially increasing the efficiency and production capacity of a solar still.

The present invention provides a new and improved solar still comprising at least one upwardly open container for holding a liquid to be evaporated, an inclined solar energy transmissive sheet mounted over said over container, trough means disposed along a lower edge of said inclined sheet for collecting condensate and means for imparting vibrations to said inclined sheet.

The present invention provides a new and improved method for operating a solar still of the type having an open container for holding a supply of water to be evaporated, an inclined solar energy transmissive sheet mounted over said open container and collection trough means disposed along a lower edge of said inclined sheet for collecting condensate comprising imparting controlled vibrations to said inclined sheet to cause small droplets thereon to coalesce into larger droplets of a size which will overcome the force tending to hold the droplets in place and thereby flow down said inclined sheet into said collection trough means.

The foregoing and other objects, features and advantages of the invention will be apparent from the following more particular description of a preferred embodiment of the invention as illustrated in the accompanying drawings.

DETAILED DESCRIPTION OF THE INVENTION

Figure 1:
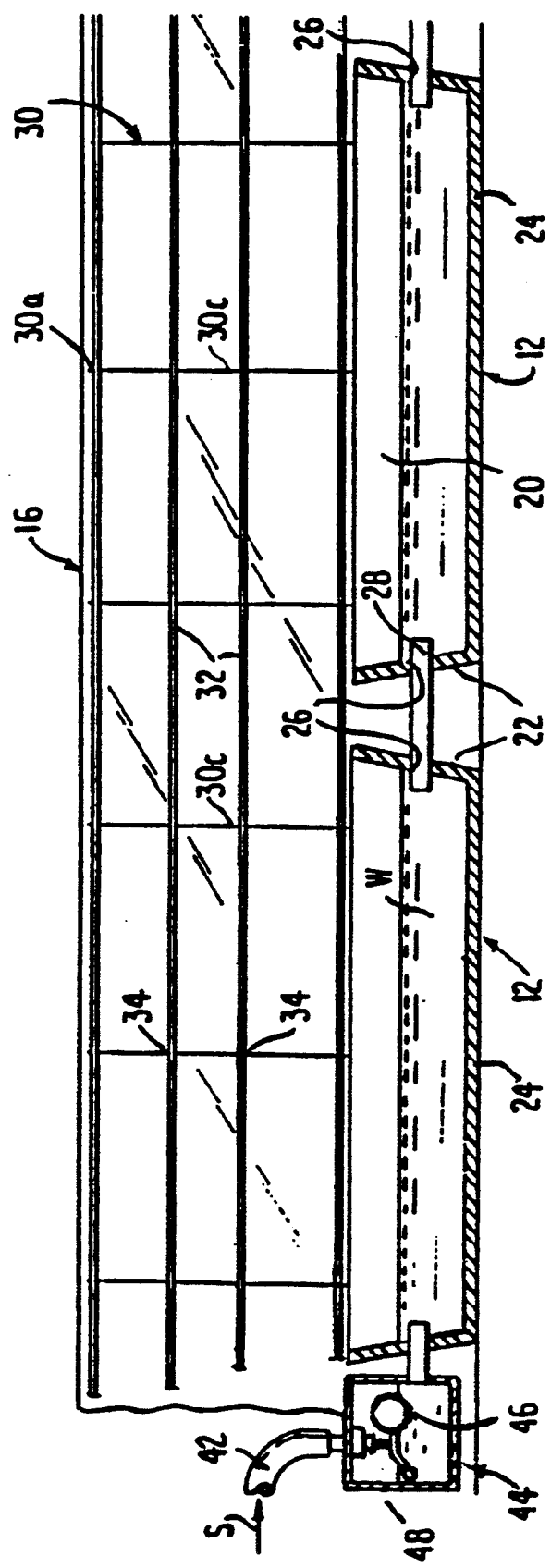
FIG. 1 is a longitudinal, vertical, sectional view of a solar still comprised of a plurality of units.
Figure 2:
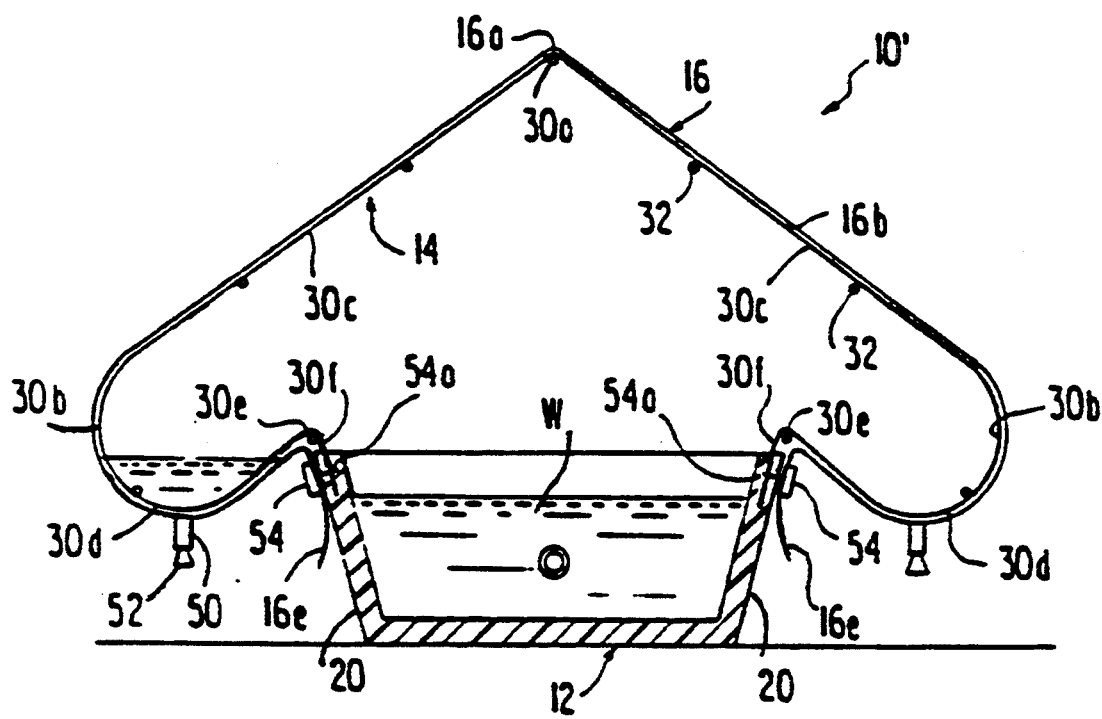
FIG. 2 is a transverse, cross-sectional view taken along the line II—II in FIG. 1.

A representative solar still is shown in FIGS. 1 and 2 which is substantially identical to a solar still disclosed in Applicant's copending application Ser. No. 07/229,778 filed Aug. 5, 1988, now U.S. Pat. No. 4,966,655 which is a continuation of application Ser. No. 07/000,355 filed Jan. 5, 1987, now abandoned.

The solar still is comprised basically of a plurality of upwardly open, foam plastic pans or trays 12 which are arranged in a row and interconnected by tubes 28 for supplying the water to be evaporated to the individual pans from a supply hose 42 through a float control valve 44 having a float 46 and a movable valve element 48. Each pan or tray 12 is comprised of laterally spaced side walls 20 and opposite end walls 22 connected to a horizontal bottom wall 24. Preferably, the interior of the container is painted black so as to absorb the heat entering the pan or tray 12.

The wire frame work 14 includes a plurality of vertical wire frame members 30 which define an upper roof section of generally triangular configuration with an apex 30a at the top and a pair of laterally spaced lower side apices 30b. Each wire frame 30 is bent so as to form downwardly depending U-shaped projections 30d which are reversely bent at 30e to terminate in straight end portions 30f which are adapted to be inserted directly into the foam walls of the trays 12. A Plurality of transverse stringers 32 may be provided which interconnect with the vertical wire frame members 30 at weld points 34.

A thin-film, flexible plastic sheet 16 is wrapped about the wire frame 14. As shown in FIG. 2, the thin-film, flexible sheet 16 forms roof portions 16b on opposite sides of a ridge line 16a at the center of the sheet. The thin-film flexible sheet is stretched to conform to the downwardly directed U-shaped projections 30d of the vertical frame members 30 to form condensate receiving trough portions. The end portions 16e of the sheets are secured to the upper edges of the side walls of the trays 12 by means of fasteners 54 which can be inserted directly into the foam plastic side walls. Suitable condensate drains 50 may be provided at periodic locations along the length of each trough portion. Suitable drain plugs 52 are provided for controlling the flow of condensate through the drains 50.

Figure 3:
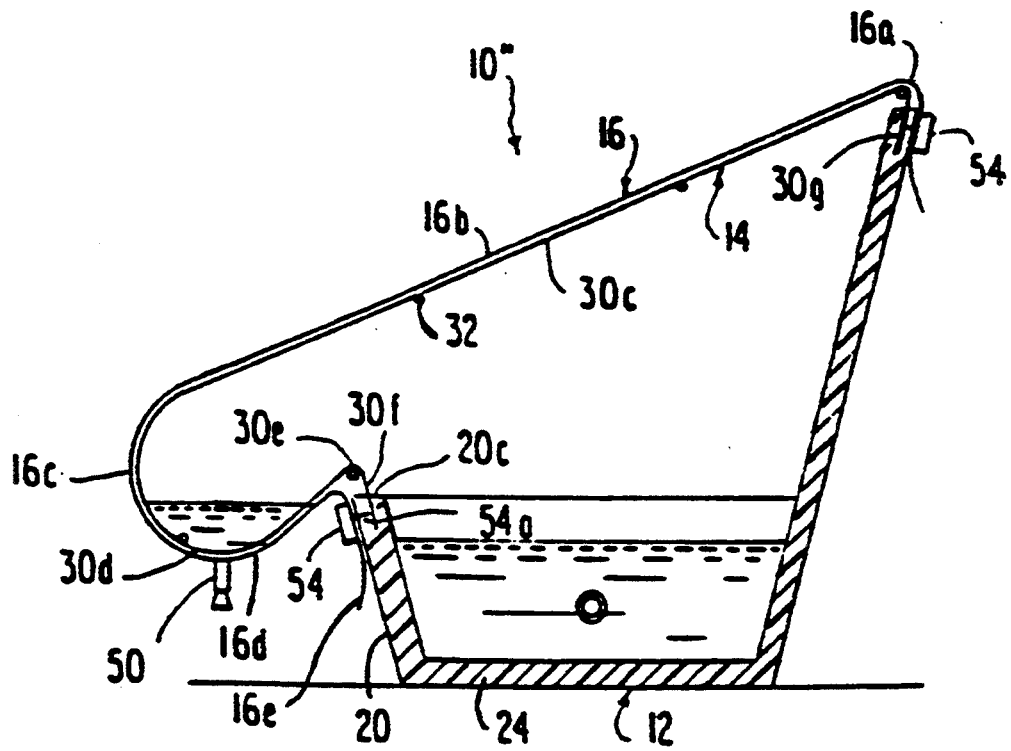
FIG. 3 is a cross-sectional view similar to FIG. 2 showing a modified construction of a solar still.

A further embodiment of the invention is shown in FIG. 3 which is also disclosed in the above identified copending application. The principle difference between the embodiment of FIG. 3 and the embodiment of FIGS. 1 and 2 resides in the fact that one wall 20' of the tray 12 extends upwardly a substantial distance higher than the other wall. Instead of having two sloping roof portions 16b as in the embodiments of FIGS. 1 and 2, the embodiment of FIG. 3 only has a single sloping roof portion 16b. Thus, the wire frame 14 and the sheet 16 are effectively eliminated from one side of the arrangement shown in FIG. 2. The ends of the vertical wire frames 30 adjacent the apex 16a of the sheet 16, are bent downwardly and directly penetrate into the top of the foam wall 20' of the tray. The end of the sheet 16 is secured by fasteners 54 as in the previous embodiment.

According to the present invention, it was found that the productivity of the solar still could be substantially enhanced by applying a moderate agitating force to the solar still, which serves to overcome the force causing the droplets to adhere in one place on the underside of the film 16. Without the vibrating, the force would eventually be overcome when small adjacent droplets coalesce into a larger drop of water which runs down the underside of the film to the collection trough. The vibrating will cause the droplets to migrate and coalesce sooner than they would without vibration. The water will still adhere to the underside of the film, but does so in a motion as a rivulet of water which quickly runs downwardly into the trough. As the droplet moves towards the trough, it grows in size as it engages and merges with other small droplets which have formed on the film, thereby providing a "snowball" effect. The timing of the vibrating needs to occur when the droplets on the film are big enough to maximize production but not so large that the force of gravity will exceed the adhesive force holding the water to the underside of the film and cause the droplets to fall from the film. A vibrator 60, described in detail hereinafter, is secured to the outer, upper edge of the side wall 20 of the tray 12 in FIG. 2. The vibrator 60 could be used in lieu of one of the fasteners 54 since the vibrator could be secured to the side wall of the tray by means of pins or nails which can be pressed directly into the foam construction of the side wall. While a single vibrator 60 is generally sufficient for each tray 12, it is possible to utilize a plurality of vibrators with each tray and locate them on the same or opposite side walls of the tray. In the embodiment of FIG. 3, the vibrator 60 is secured to the extended side wall 20' of the tray 12 for the purpose of vibrating the thin-film, plastic sheet 16.

Since the inclined sheet 16 of the embodiment of FIG. 1—3 inclusive is the same solar transmissive cover through which the solar energy enters the still, the efficiency of the solar still can be increased by causing the droplets to move more quickly to the collection trough. As a result, the droplets will not accumulate to the extent that they will impede or reflect solar radiation.

Figure 4:
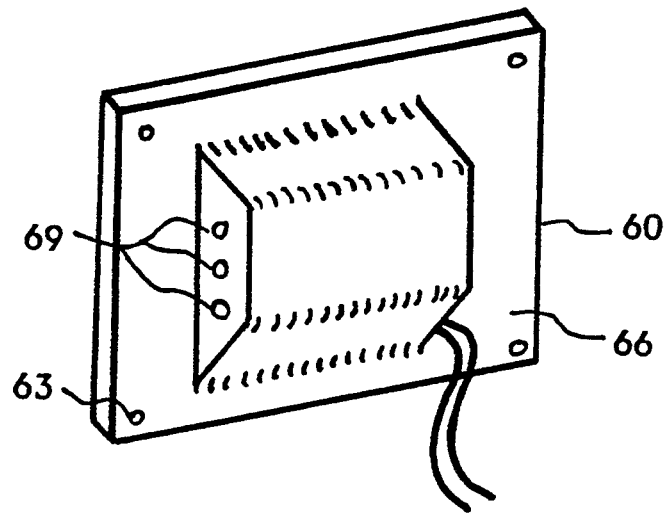
FIG. 4 is a perspective view of a vibrator device according to the present invention adapted to be mounted on a solar still.
Figure 5:
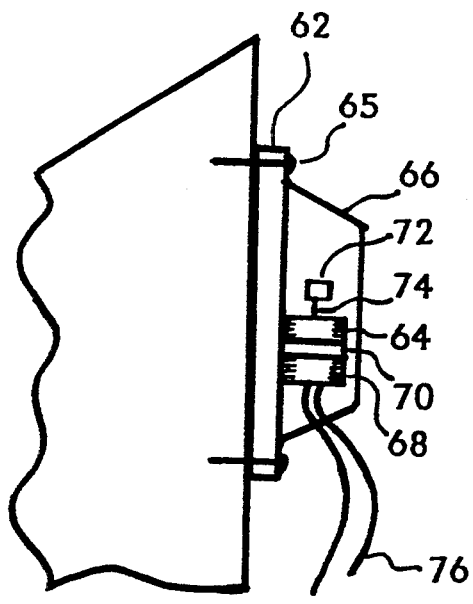
FIG. 5 is a schematic representation of a first form of vibrator device mounted on a solar still.

A first embodiment of a suitable vibrator device according to the present invention is shown in FIGS. 4 and 5. The vibrator 60 is comprised of a flat, base plate 62 having a vibrator 64 mounted thereon and a shaped cover plate 66 overlying the vibrator 64. The cover plate 66 may be provided with a plurality of ventilation apertures 69 which are so arranged as to prevent the entry of rain while providing adequate ventilation to the vibrator. The cover plate 66 and the base plate 62 are provided with aligned apertures 63 through which suitable securing means 65 may extend for securing the assembly to the side wall of a pan or tray upon which the condensation collecting sheet is mounted.

Figure 6:
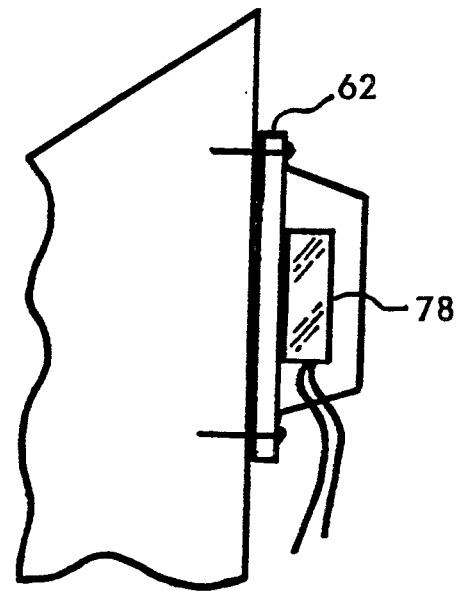
FIG. 6 is a schematic representation of a second form of vibrator device mounted on a solar still.

The vibrator 64, as shown in FIG. 5, is comprised of a small, electric motor 68 secured to the base plate by a suitable bracket 70. An eccentrically mounted weight 72 is secured to the output shaft 74 of the motor 68 and suitable leads 76 extend outwardly of the housing for connection to a suitable power supply. In the embodiment of FIG. 6, the vibrator is comprised of a simple, electrically operated buzzer 78 secured to the base plate 62 by any suitable means. Since electrically operated buzzers are so old and well known in the art, it is not deemed necessary to disclose the details thereof in the present application. In both embodiments, the vibrations generated by the vibrator 64 or buzzer 78 are transmitted to the wall of the pan upon which the vibrator is mounted and to the solar transmissive cover sheet upon which condensation will form, that is, the sheet 16 as disclosed in FIGS. 1-3. While it is best to mount the vibrator 60 on a wall of a pan or tray containing a liquid to be evaporated, at a location above the liquid in close proximity to the cover sheet upon which the condensate will collect, other locations and arrangements for mounting the vibrator would be suitable depending upon the construction of the specific solar still.

Figure 7:
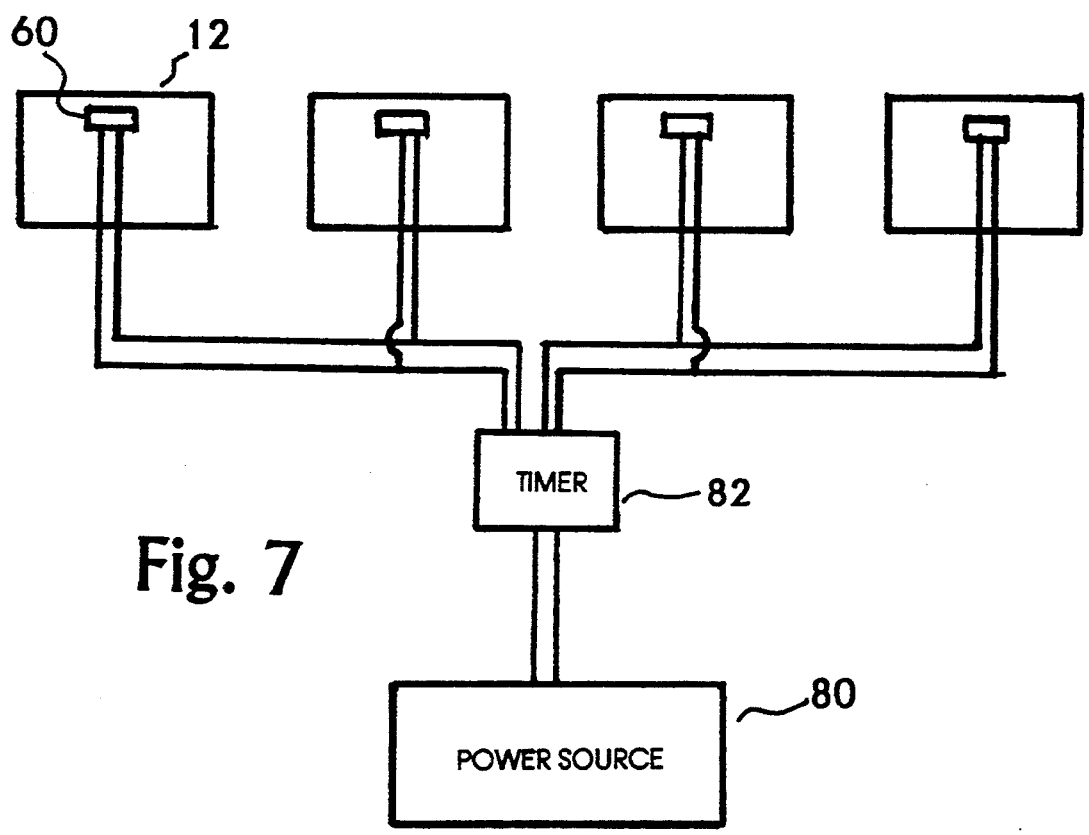
FIG. 7 is a schematic wiring diagram for a plurality of vibrator devices mounted on a plurality of solar stills.

FIG. 7 discloses a suitable schematic wiring diagram for connecting the vibrators 60 attached to a plurality of respective trays 12 to a suitable power source 80 through a timer 82. The timer for the vibrators must be adjustable so that the user can set the on/off sequence to match the characteristics of the particular solar still and its operating conditions. An example would be to have a vibrator for a specific tray and collector assembly go on for 30 seconds and go off for 3 minutes, repeatedly from 9:30 A.M. until 8:30 P.M. This sequence has been determined experimentally for a given distiller, location and season. One may, for example, have to employ four seasonal settings according to climate, etc. For example, one may be able to vibrate on a faster schedule in the summer because the droplets are forming more quickly.

As shown in FIG. 7, the vibrators associated with a first plurality of solar stills may be electrically connected together to a timer for simultaneous operation, whereas the vibrators connected to a second plurality of solar stills may be connected together for simultaneous operation through the timer at a period when the vibrators associated with the first group of solar stills is in the non-operating condition. In this way, the power source can be utilized more efficiently.

The present invention has been described with respect to a specific type of still as disclosed in FIGS. 1-3 utilizing a thin-film, flexible sheet of solar transmissive material upon which condensation droplets will form. It is possible to utilize the vibrators according to the present invention with other types of solar still construction wherein the materials of the solar still are different from those in the present application. Frequently, a sheet of glass is used as the solar transmissive cover upon which the condensation droplets will form. In view of the weight and rigidity of a glass sheet as compared to the thin-film, flexible sheet disclosed above, the vibrator would have to provide stronger vibrations. The vibrators according to the present invention may be used in remote areas by employing photo voltaically charged battery power sources with a simple mechanical or solid-state timing device. Such timing devices are old and well known in the art and need not be described in detail herein. Where 110 volt alternating current power is available, it is simple to use 110 volt buzzers, etc. or use a transformer to provide 6 or 12 volt direct current. Alternatively, one may also use non-electric mechanical methods for periodically vibrating the stills.

While the invention has been particularly shown and described with reference to preferred embodiments thereof, it will be understood by those in the art that the foregoing and other changes in form and details may be made therein without departing from the spirit and scope of the invention.

What is claimed is:

1. A solar still comprising:
   container means for holding a supply of liquid to be evaporated,
   inclined solar transmissive cover means mounted on said container means upon which droplets of condensation form and
   vibrator means mounted on said solar still for imparting vibrations to said cover means to facilitate downward flow of said droplets on said inclined cover means.

2. A solar still as set forth in claim 1, wherein said vibrator means is comprised of an electric motor mounted on said container means, said electric motor having an output shaft with an eccentric weight thereon.

3. A solar still as set forth in claim 1, wherein said vibrator means is comprised of an electrically operated buzzer means mounted on said container means.

4. A solar still as set forth in claim 1, wherein said vibrator means is electrically operated and includes power supply means and timer means connected between said power supply means and said vibrator means for periodically operating said vibrating means.

5. A solar still as set forth in claim 4, wherein said solar still is comprised of a plurality of container means and associated cover means, each having vibrator means mounted thereon with a first plurality of said vibrator means being connected together for simultaneous operation according to a first timing sequence by said timer means and a second plurality of vibrator means connected together for simultaneous operation according to a second timing sequence by said timer means different from said first timing sequence.

6. A method of operating a solar still having container means for holding a supply of liquid to be evaporated and inclined solar transmissive cover means thereon upon which droplets of condensation form comprising vibrating at least the cover means to precipitate the downward flow of said droplets on said inclined cover means and collecting said droplets of condensate.

7. A method as set forth in claim 6 where the vibrating is intermittent.

8. A method as set forth in claim 7, wherein a plurality of stills are provided and the vibrating of at least one still is alternated with the vibrating of at least one other still.

* * * * *